United States Patent [19]

Heynisch et al.

[11] 4,213,810
[45] Jul. 22, 1980

[54] ORIENTATION LAYER FOR A LIQUID CRYSTAL DISPLAY AND METHOD OF MANUFACTURE

[75] Inventors: Hinrich Heynisch, Graefelfing; Hans Krueger, Munich, both of Fed. Rep. of Germany

[73] Assignee: Siemens Aktiengesellschaft, Berlin & Munich, Fed. Rep. of Germany

[21] Appl. No.: 35,823

[22] Filed: May 4, 1979

[30] Foreign Application Priority Data

May 9, 1978 [DE] Fed. Rep. of Germany ....... 2820245

[51] Int. Cl.² ........................... C09K 3/34; G02F 1/13
[52] U.S. Cl. ...................................... 156/73.1; 427/57
[58] Field of Search .......................... 427/57; 156/73.1

[56] References Cited

U.S. PATENT DOCUMENTS

| | | | |
|---|---|---|---|
| 3,046,839 | 7/1962 | Bird et al. | 88/65 |
| 3,941,901 | 3/1976 | Harsch | 427/108 |

FOREIGN PATENT DOCUMENTS

| | | |
|---|---|---|
| 2158563 | 6/1972 | Fed. Rep. of Germany . |
| 2256317 | 5/1974 | Fed. Rep. of Germany . |
| 2422784 | 11/1974 | Fed. Rep. of Germany . |
| 2457641 | 8/1975 | Fed. Rep. of Germany . |
| 1372868 | 11/1974 | United Kingdom . |
| 1423250 | 2/1976 | United Kingdom . |

OTHER PUBLICATIONS

Janning, "Thin Film Surface Orientation for Liquid Crystals", Appl. Phys. Lett., 21(#4), pp. 173-174, Aug. 15, 1972.

Meyerhofer, "New Technique of Aligning Liquid Crystals on Surfaces", Appl. Phys. Lett., 29(#11), pp. 691-692, Dec. 1, 1976.

Chabicovsky et al., "Liquid-Crystal Cells with Special Electrodes for the Generation of Uniform Colors by Optical Birefringence", IEEE Trans. on Electron Dev. ED-24 (#7), Jul. 1977, pp. 807-810.

Greubel et al., "The Fluorescence Activated Display 'Flad'", Electronik 1977, (#6), pp. 55-56.

*Primary Examiner*—James R. Hoffman
*Attorney, Agent, or Firm*—Hill, Van Santen, Steadman, Chiara & Simpson

[57] ABSTRACT

An orientation layer for liquid crystal displays and a method for its construction is provided. Ultrasonic waves are used to create a flat, stationary wave field which is used to direct the deposition of material in order form parallel ridges and associated grooves on an orientation layer in order to orient the liquid crystals. Where the ridges are composed of a conductive or dichroitic material and the grooves have an interval which approximately corresponds to one half of the wavelength of the illuminating light, the orientation layer both orients the liquid crystals and functions as a grid polarizer.

13 Claims, 3 Drawing Figures of two carrier plates which enclose a liquid crystal layer between them and its manufacture. More particularly, the invention relates to a layer at least one of the carrier plates which orients the liquid crystal layer which is manufactured using an ultrasonic, stationary wave field to introduce parallel grooves into the surface of the orientation layer.

2. Description of the Prior Art

Among the multitude of alignment processes known and tested up to now, the so-called oblique sputtering method, (See Applied Physics Letters, 21:173 (1972)), has traditionally been employed. Advantageously, obliquely sputtered layers orient uniformly well and reliably, and moreover, do not attach the liquid crystal substance. However, oblique sputtering still has a significant fabrication cost, especially when the liquid crystal molecules are to assume a small angle of incidence, (a maximum of approximately 5°), with respect to the substrate plane. This slight tilting which is strived for in many areas of employment requires a refinement of the sputtering technique. One method, for example, applies two layers of different thickness and with different angles to the substrate, (Physics Letters 29:691 (1976)). In addition, there is a further disadvantage with sputtering. Upon sputtering from oblique directions, elevations located on the substrate such as electrode segments or spacers cast shadows in which the liquid crystal is not oriented or is only imperfectly oriented. These shadow effects can be eliminated when one profiles the orientation layer by means of a friction technique. Such a mechanical treatment has the further advantage that the liquid crystal molecules are somewhat inclined with respect to the substrate surface in and of themselves. However, rubbed layers, even when they are processed by machine, still only deliver conditionally acceptable liquid crystal textures.

Such an orientation technique in which the groove or channel system is generated by means of the exposure of a light-sensitive layer with interfering coherent light sources is described in the German OS No. 2,256,317. Films which are structural using this interference pattern possess faultless orientation. However, this special photo-technology requires a number of fabricating steps and is less suited for mass production.

SUMMARY OF THE INVENTION

The present invention has the underlying objective of specifying an improved method by which one can provide a layer with a line or groove pattern with which to orient neighboring liquid crystal molecules in a uniform angle of incidence—uniformly plate parallel. To this end, the use of an ultrasonic, stationary wave field is proposed.

In the inventive method, the wave field can be generated in either the plane of the substrate or in a plane extending above the substrate. In the former case, the patterned layer is created by the layer material being deposited in the nodal lines of equal pressure, having been pressed towards the nodal lines from the strip-like areas lying therebetween. If the plane of the wave field is situated above the carrier plate and one sends a material beam through this wave field, then a layer having a characteristic structure is deposited on the substrate: a ribbed pattern corresponding to the nodal lines of the wave field is superposed by structures which have been formed by means of deflected, obliquely striking material particles.

Particular advantages are offered by an alternate method in which the interval formed between neighboring grooves is approximately of the same magnitude as the wavelength of the illumination light and where, in addition, the walls between the grooves contain a strip consisting of a conductive or dichroitic material. The conductive strips can consist of electrically conductive or semiconductive material and upon employment of a pigment, these molecules are to assume a preferential pattern. Along with the additional strip pattern, the structured layer cannot only orient the liquid crystal substance but, rather, can also linearly polarize the passing illumination light since it functions in a known manner like a grid polarizer. The polarizing strips can be obtained in various ways without any additional outlay. One either selects a suitable material for the layer or, in a further step, one applies the desired grid pattern onto the finished orientation layer, for example, by means of oblique sputtering of an electrically conductive material. Care must be taken that the strips absorb the light as completely as possible and that the clear interval between strips lying next to one another amounts to at most one and preferably, for the sake of security, at most a half wavelength of the highest frequency part of the light. Further details concerning the construction and the manner of functioning of a grid polarizer can be derived from the U.S. Pat. No. 3,046,839.

This said double function can be performed without further effort by using a layer manufactured within the framework of the invention. This result is obtained since the grid interval of the polarizer will amount to at most a few 10ths of a $\mu$m and the grooves will sufficiently orient the illumination light when they lie closer together than 10 $\mu$m.

Recently, there have been a number of attempts to develop a simultaneously orienting and polarizing film, because the polarizer foils, which up to now have always been glued on the outside, age very quickly and are included among the display parts with the shortest life span. Thus, it is discussed in the German OS No. 2,457,641 to reinforce a coating with a long-chain polymer, use a dichroitic substance, and give this film a preferential direction by means of a shearing. Such an attempted solution, however, makes no use of a layer having a micro-structure from which the present invention proceeds.

The grid polarizer is more easily manufactured where the strip interval is larger, i.e., when used with illumination light having longer wavelengths. Therefore, in a further development of the invention, it is provided to combine a liquid crystal display, having an orienting and polarizing layer, with a so-called fluorescent body (cf. in this regard the German OS No. 2,554,226 or Electronik 6:55 (1977)). Such a body re-emits the light exciting its fluorescing particles in a relatively narrow frequency band which is displaced towards longer wavelengths.

Various other objects, advantages, and features of the present invention will become readily apparent from the ensuing detailed description in conjunction with the enclosed drawings, and the novel features will be particularly pointed out in the appended claims.

DESCRIPTION OF THE PREFERRED EMBODIMENTS

Figure 1:
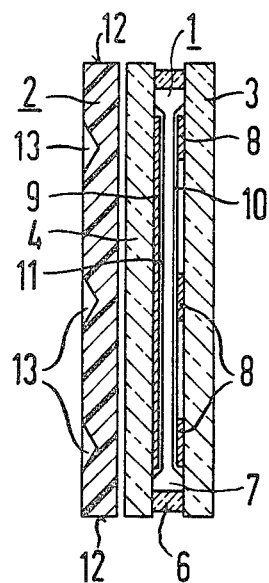
FIG. 1 is a side elevational view showing a liquid crystal display utilizing a fluorescent body and manufactured according to the invention.
Figure 2:
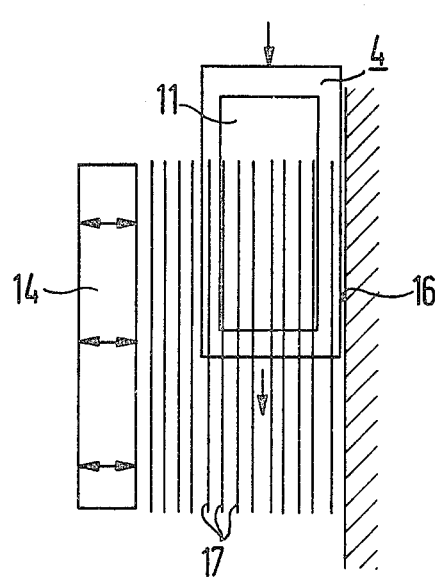
FIG. 2 is a schematic view of a device for implementation of an alternate method of the invention.

In part, the Figures are very schematic. All individual parts of a display or of a manufacturing arrangement, (for example the electric lines of a liquid crystal cell, or the support and drive elements of a sputtering system), which are not absolutely necessary for an understanding of the invention have been omitted for the sake of simplicity. Additionally, in the Figures the drawing, parts which correspond to one another are provided with the same reference symbols.

The display of FIG. 1 contains a seven-segment liquid crystal cell 1 as well as a fluorescence plate 2 lying behind it in the direction of view. In detail, the cell contains two glass plates, a front carrier plate 3 and a back carrier plate 4. Both carrier plates are tightly connected with one another via a frame 6. The interior space bounded by the frame and the two substrates is filled with a liquid crystal layer 7. Moreover, the two plates 3, 4 are respectively provided with conductive coatings, (electrode segments 8, continuous back electrode 9), on their interior surfaces facing one another, as well as with an orienting and polarizing layer 10, 11, hereinafter designated as the orientation layer. The fluorescent plate 2 is mirrored having a reflection layer 12 on its side surfaces and contains light exit windows in the form of notches 13 in the back side. Each notch is allocated to one of the electrode segments 8. In the present case, the liquid crystal display functions according to the principle of a twisted nematic cell with polarizers crossed with respect to one another, presented in detail in German OS No. 2,158,563. Examples of how the fluorescent plate 2 is to be structured and how it cooperates with the nematic cell or light valve are disclosed in the references German OS No. 2,544,226 or Electronik 6:55 (1977). The display is laid out in such manner that only those electrode segments are activated which precisely belong to the image background, (known as "complementary" or "inverse" activation). Upon activation, a luminous numeral appears in the fluorescence color or plate 2 on a dark background.

The methods for applying the orientation layers are set forth in the following description.

First one generates a stationary, planar, ultrasonic wave field nodal lines 17 between an ultrasonic generator 14 and a reflector 16 lying opposite the generator. The carrier plate 4 to be coated is now guided through this wave field in the direction of the nodal lines 17. While the carrier plate 4 proceeds through the wave field, it is coated in a CVD (chemical-vapor-deposition) process. The wave field guides the deposition so that a structure is formed in the growing layer which corresponds to the wave field. Wall-like elevations are layered up along the nodal lines by means of material accumulation, thus creating grooves in the area of the antinodes. The material accumulates uniformly creating a symetrical distribution about the nodal lines. If one wishes a slightly tilted texture, then one could create additional elevations at suitable locations, for example, in the grooves, which induce the desired angle of incidence in the liquid crystal layer. Regular groove interruptions can be generated by means of correspondingly varied interference patterns. A few techniques for generating a tilted, homoeotropic texture are cited in IEEE Trans. Electron Devices, ED-24, 807 (1977).

In an alternate method, the carrier plate is first dipped in the material. The coated plate is then placed in the wave field. The wave field causes the still liquid coating to conform to the wave-forms, forming the ridges and grooves.

If neighboring nodal lines are to have an interval of approximately 0.5 m, then one requires an ultrasonic wavelength of approximately 1 m and, thus, an ultrasonic frequency of approximately 300 MHz, since the sound velocity in the dominant gas of the CVD-process lies approximately at 300 m/s.

The orientation layer consists essentially of silicon dioxide to which metal, silver or gold for example, is added. The layer at the same time also represents a pattern of electrically conductive strips which are parallel to one another and thus, linearly polarizes light of a specific wavelength, (the grid only allows that portion of the light to pass which oscillates perpendicular to the strip direction). If the grating constant is adapted to the frequency limit of the emission band of the fluorescing particles, the higher frequency excitation light for the fluorescent plate is allowed to pass through unweakened while the emission light is linearly polarized to a high polarization degree.

Figure 3:
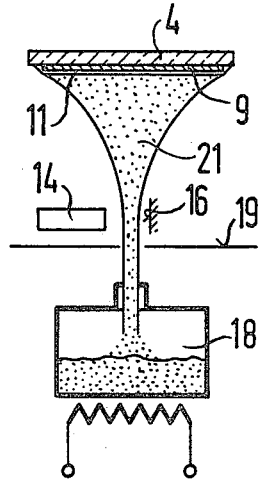
FIG. 3 is a schematic view of a device for implementation of another method of the invention.

FIG. 3 illustrates an arrangement with which one subjects the layer material to a wave field before it reaches the carrier plate. The material concerned is vaporized from a vaporizer 18 and then formed into a beam 21 with an aperture 19. One sends this beam through a flat, stationary wave field which could likewise be constructed by means of an ultrasonic generator 14 and a reflector 16 lying there opposite. Upon passing through this wave field, the beam is spread. A layer is deposited on the carrier plate 11 having a strip-shaped pattern. The basic pattern is somewhat modified from structures of particles striking obliquely to the sputtering direction.

The invention is not limited to the sample embodiments illustrated. Thus, one could generate the wave field by means of the interferences of a plurality of ultrasonic sources instead of by means of reflections. In both alternatives, one must only take care that the layer material is sufficiently dense in the wave field so that ultrasonic waves can form with sufficiently large amplitudes. If the inventively manufactured layer is also to serve for polarizing, then one is in no way restricted to narrow-band illuminations, since a grid polarizer polarizes a relatively broad frequency band with a rather well-defined upper band edge. Because of this characteristic, given certain conditions, color contrasts could also be generated with suitably structured layers. Apart from that, the proposed method is useful when the layer is only meant to orient and polarizers are either not required or are realized by means of other specific parts.

While we have disclosed exemplary structures to illustrate the principles of the invention, it should be understood that we wish to embody within the scope of the patent warranted hereon, all such modifications as reasonably and properly come within the scope of our contribution to the art.

We claim as our invention:

1. In an improved method for the manufacture of an orientation layer which consists of parallel grooves introduced on a surface of a carrier plate by depositing a material under the influence of a flat, stationary wave field, for use in a liquid crystal display cell having two carrier plates which enclose a liquid crystal layer between them, the improvement of such method which comprises:

generating said wave field using ultrasonic waves.

2. In an improved method for the manufacture of a liquid crystal display as described in claim 1 wherein said wave field is generated by a resonator.

3. A method for the manufacture of at least one orientation layer for use in a liquid crystal display device of the type which includes two carrier plates with a liquid crystal layer located therebetween, which comprises:

generating a flat, stationary, ultrasonic wave field;
providing a material for deposition on a carrier plate;
depositing said material on a carrier plate; and
placing said carrier plate in close proximity to said wave field, whereby parallel ridges or walls and grooves of the material are introduced onto the surface of the carrier plate forming an orientation layer for the liquid cyrstals.

4. A method for the manufacture of an orientation layer for use in liquid crystal display device as described in claim 3 wherein the deposition step is a dipping process.

5. A method for the manufacture of an orientation layer for use in a liquid crystal display device as described in claim 3 wherein the deposition step is conducted in a vacuum.

6. A method for the manufacture of an orientation layer for use in a liquid crystal display device as described in claim 5 wherein said vapor deposition comprises:

forming said material into a vaporized beam;
conducting said beam through said wave field; and
precipitating said material upon said carrier plate.

7. A method for the manufacture of an orientation layer for use in a liquid crystal display device as described in claim 3 wherein the deposition step consists of a chemical-vapor-deposition process.

8. A method for the manufacture of an orientation layer for use in a liquid crystal display device as described in claim 3 wherein said wave field is generated by an ultrasonic generator with a reflector lying opposite said generator, and said material is deposited on said carrier plate while in said wave field using a chemical-vapor-deposition process.

9. A method for the manufacture of an orientation layer for use in a liquid crystal display device as described in claim 3 wherein said material is deposited on said carrier plate by a dipping process, and said dipped carrier plate is then immediately placed in said wave field.

10. A method for the manufacture of an orientation layer for use in a liquid crystal display device as described in claim 3 and further comprising:

depositing a strip of a conductor material on the ridges of the orientation layer.

11. A method for the manufacture of an orientation layer for use in a liquid crystal display device as described in claim 3 and further comprising:

depositing a strip of a dichroitic material on the ridges of the orientation layer.

12. A method for the manufacture of a pattern on an orientation layer for use in a liquid crystal display device of the type which has a liquid crystal layer encapsulated between two carrier plates which comprises:

generating a flat, stationary, ultrasonic wave field;
coating an interior surface of a carrier plate with a suitable material; and
moving said carrier plate in at least close proximity to said wave field until parallel ridges or walls of the coating material are introduced onto the surface of said carrier plate.

13. A method for the manufacture of a pattern on an orientation layer as described in claim 12 wherein said coating step consists of a chemical-vapor-deposition process.

* * * * *